W. J. MOELLER.

ELASTIC OR EXPANSIBLE PAVING JOINT.

APPLICATION FILED FEB. 15, 1919.

Reissued June 1, 1920. 14,871.

Inventor

William John Moeller,

By Kenyon & Kenyon,

Their Attorneys

UNITED STATES PATENT OFFICE.

WILLIAM JOHN MOELLER, OF WYOMING, OHIO, ASSIGNOR TO THE PHILIP CAREY MANUFACTURING COMPANY, OF LOCKLAND, OHIO, A CORPORATION OF OHIO.

ELASTIC OR EXPANSIBLE PAVING-JOINT.

14,871. Specification of Reissued Letters Patent. Reissued June 1, 1920.

Original No. 1,220,766, dated March 27, 1917, Serial No. 707,773, filed July 5, 1912. Application for reissue filed February 15, 1919. Serial No. 277,360.

*To all whom it may concern:*

Be it known that I, WILLIAM JOHN MOELLER, a citizen of the United States, residing at Wyoming, in the county of Hamilton and State of Ohio, have invented certain new and useful Improvements in Elastic or Expansible Paving-Joints, of which the following is a specification.

My invention relates to means for providing for the contraction and expansion of street paving.

The object of my invention is to provide simple, convenient, economical and efficient means for taking up the contraction and expansion in street pavements formed of brick, granite blocks, and the like and to form the same as a permanent part of the pavement while the pavement is being made.

My invention consists in the construction, combination and arrangement of parts and to the process as herein set forth and claimed.

Pavements consisting of brick, granite blocks, wood blocks and the like will contract and expand in accordance with the change of temperature. When the temperature is warm the material comprising the pavement will expand, and when the temperature is colder the material will contract. It, therefore, becomes necessary to place expansible material in said pavement at intervals to compensate for this contraction and expansion of the material comprising the pavement. It has heretofore been necessary, in building the pavement, to place thin strips of wood between the layers of granite or brick, and after the same are placed in position, to withdraw the boards and fill the space thus formed, with coal tar pitch, and other materials.

In the drawings, which serve to illustrate the construction, application and use of my invention:

Figure 1:
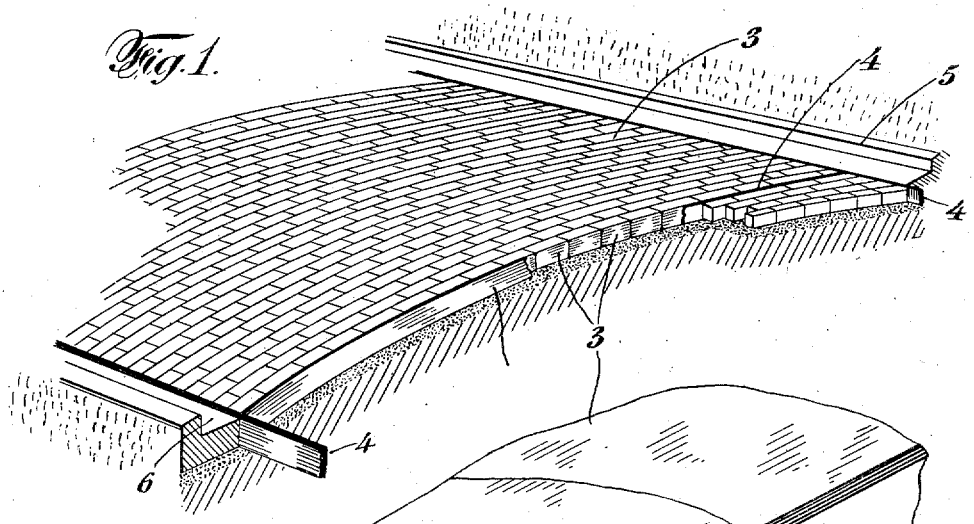
Figure 1 is a perspective view representing a paved street having my elastic paving joint permanently embedded therein between the paving blocks and the curb and at intervals transversely of the pavement and extending across the street between the curbs.
Figure 2:
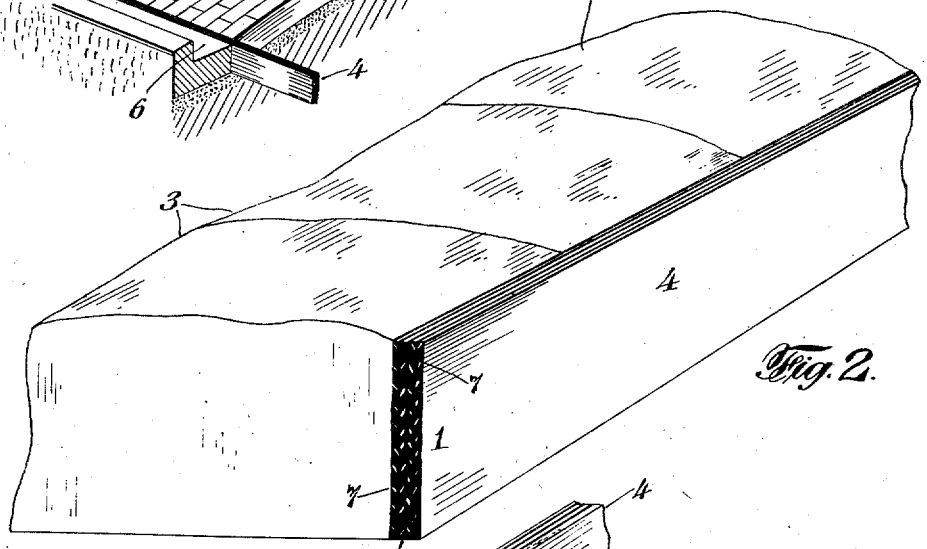
Fig. 2 is a perspective view upon a larger scale showing a section of elastic paving joint and a row of paving blocks abutting it upon one side.
Figure 3:
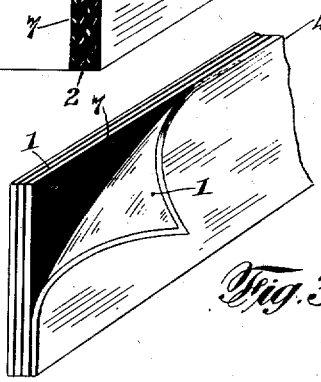
Fig. 3 is a perspective view of a portion of one of my elastic paving joints showing one of the layers of saturated felt turned or rolled back.

My invention comprises strips of material composed of a plurality of layers of heavy soft felt 1, each of which is thoroughly saturated or impregnated with asphalt compound 2 in such quantity as is required, the same depending on the climatic conditions. It is desirable that the felt be saturated to an extent which will not cause the asphalt compound to run in hot weather. When so saturated it will not crack in cold weather. The felt is first saturated, as stated, and a plurality of layers of the saturated material 1 are secured together by layers of asphalt 7 of sufficient thickness to withstand the various conditions of temperature or climatic conditions, as above set forth.

The strips of material thus formed are preferably about one-half inch thick and of a width to correspond with the vertical thickness of the granite block or the brick 3 composing the pavement, and may be formed in any length desired. These strips 4 may be inserted at intervals of fifty feet, more or less, depending on the amount of contraction and expansion necessary to be compensated for, and may extend from curb 5 to curb 6 or from the street car rail to the curb as the case may be in one or more sections, as desired, or they may be introduced at still other places to constitute elastic joints or fillers between adjacent parts of the pavement. For taking up the lateral contraction and expansion of the pavement I place these strips lengthwise adjacent the curb and lay the brick or granite pavement blocks 3 against the same. These strips 4 when once placed in position, become a permanent part of the pavement and it is unnecessary to remove them. Thus the expense of placing a temporary board in position to form a space for the coal tar pitch, removing the same and filling it with coal tar pitch, is dispensed with. At the same time, a more elastic, expansible, firm, secure, solid and substantial structure is permanently secured in place, and any cracks or crevices between it and the adjacent pavement or curb are filled with coal tar pitch such as is used between the several blocks of paving.

The uniting of the several strips of felt or other dense matted material together, and the impregnation or saturation of the same, produces as a whole, a solid, tough, relatively rigid article of block-like or board character, well adapted to perform the functions for which the same is intended. The addition of the intermediate layers or walls of asphalt between the felt strips not only assists in preserving the otherwise impregnated strips by making them waterproof, etc., but the distinct walls of asphalt permit a substantial amount of yield or play of the strips face-wise relative to each other so that they may adjust themselves when the member as a whole is bent or deflected in a face-wise direction, in keeping with the changing relations of the blocks or parts of the pavement adjoining the elastic joint or filler. Another feature of advantage incident to the simple character of the filler or joint herein disclosed resides in the fact that there are no separate surface particles or friable substances capable of being rubbed off under the frictional action of parts adjoining the faces of the joint, but the faces of the joint or filler itself are exposed in a way to present integral portions of the body to the adjacent faces of the paving blocks, etc., and by reason of the adhesive character of the joint,—incident to its impregnation,—the exposed surfaces of the joint and the blocks, etc., will adhere, to the end that the pavement members are effectually bonded together throughout and the joint or filler prevented from displacement.

The asphalt used in this structure is so tempered that it is not affected by weather conditions, being free from moisture, ash and other impurities, and is especially adapted for work underground. The felt is completely protected by this indestructible asphalt and insures a permanent street paving joint. It makes a compact board which is easily handled and is a great saving in time and labor and the cost of material in the construction of the joint in accordance with my invention as compared with previous methods.

An advantage of my construction of paving joint is that it will not run like the pitch in summer, or crack like pitch in winter, nor will it run to the gutter on arched streets like coal tar pitch.

Finally, this paving joint is superior to others because it makes a more lasting and satisfactory street.

My invention is capable of some modification without material departure from its scope or spirit, as for instance, any suitable water proofing material may be substituted for the asphalt compound.

I claim:

1. An expansion joint for street pavements comprising a board composed of separate layers of soft felt saturated with asphalt compound, bonded together by a distinct interposed layer of asphalt, compressed into a relatively hard solid body capable of substantial compression and expansion, and presenting a tough non-frayable wearing edge.

2. An expansion joint for street pavements comprising a board composed of a body of soft felt impregnated with an asphalt compound and compressed into a relatively hard solid condition to render the same capable of allowing for heavy pressures, without fracture, and presenting a tough non-frayable wearing edge.

3. In combination with a street pavement formed of brick or equivalent material, an elastic joint permanently embedded in said pavement comprising a plurality of flat strips of matted expansible material saturated with asphalt compound, and having a distinct flat strip of asphalt forming a body of considerable thickness secured between and binding each two adjacent strips of matted expansible material, said joint being permanently disposed edgewise in said pavement, substantially as set forth and for the purpose specified.

4. An expansion joint for street pavements comprising a board composed of a body of soft material impregnated with an asphalt compound and compressed into a relatively hard solid condition to render the same capable of allowing for heavy pressures without fracture.

5. An expansion joint for street pavements, comprising a board composed of a supporting layer, and a layer of asphalt compound compressed together into a relatively hard solid condition to render the same capable of allowing for heavy pressures without fracture.

6. An expansion joint for street pavements comprising a board composed of a supporting layer, and a layer of asphalt compound secured together into a relatively hard solid condition to render the same capable of allowing for heavy pressures without fracture.

7. An expansion joint for street pavements comprising a board composed of a supporting layer and a layer of asphalt compound secured together into a relatively hard solid condition.

8. An expansion joint composed of a soft material saturated with a waterproofing substance and forming a relative rigid block or board-like structure.

WILLIAM JOHN MOELLER.